United States Patent
Hayden

[19]

[11] Patent Number: 5,630,009
[45] Date of Patent: May 13, 1997

[54] METHOD AND APPARATUS FOR CONTROLLING A DC ELECTRIC MOTOR

[75] Inventor: William L. Hayden, Northville, Mich.

[73] Assignee: Ford Motor Company, Dearborn, Mich.

[21] Appl. No.: 903,402

[22] Filed: Jun. 24, 1992

[51] Int. Cl.⁶ .................................................. H02P 7/288
[52] U.S. Cl. ............................ 388/838; 318/DIG. 2; 361/26; 361/32
[58] Field of Search .......................... 318/DIG. 2, 590, 318/592, 280–286; 388/800–838, 839–841; 361/23–26, 30–34, 88–92, 105

[56] References Cited

U.S. PATENT DOCUMENTS

| | | | |
|---|---|---|---|
| 2,306,810 | 12/1942 | Jones | 175/294 |
| 2,689,933 | 9/1954 | Veinott | 361/32 |
| 3,086,238 | 4/1963 | Baumhart | 15/250.12 |
| 3,247,435 | 4/1966 | Baumhart et al. | 318/332 |
| 3,684,938 | 8/1972 | Ori | 318/DIG. 2 |
| 3,701,934 | 10/1972 | Guidicelli | 318/DIG. 2 |
| 3,716,766 | 2/1973 | Suzuki | 318/DIG. 2 |
| 3,919,612 | 11/1975 | Ratzel et al. | 318/DIG. 2 |
| 4,131,834 | 12/1978 | Blaszkowski | 318/483 |
| 4,306,264 | 12/1981 | Alessio | 361/32 |
| 4,314,186 | 2/1982 | Gille et al. | 318/434 |
| 4,320,329 | 3/1982 | Gille et al. | 318/443 |
| 4,499,410 | 2/1985 | Iacoponi et al. | 318/444 |
| 4,625,157 | 11/1986 | Phillimore | 318/443 |
| 4,634,944 | 1/1987 | Hastings et al. | 318/443 |
| 4,636,698 | 1/1987 | Leclercq | 318/DIG. 2 |
| 4,686,599 | 8/1987 | Hilfiker | 361/32 |
| 4,689,536 | 8/1987 | Iyoda | 318/483 |
| 4,984,123 | 1/1991 | James | 361/26 |

FOREIGN PATENT DOCUMENTS 3239189  10/1991  Japan .

*Primary Examiner*—David S. Martin
*Attorney, Agent, or Firm*—Roger L. May; Mark S. Sparschu

[57] ABSTRACT

A direct current (DC) electric motor is shifted between higher and lower operating speeds in response to motor operating conditions to prevent motor stalling, overheating and burnout. Switches are performed between two or among more than two operating curves defined for the DC motor with switches preferably taking place approximately at points of intersection of the operating curves. The high or higher speed curve typically results from inducing inefficiency into the motor such that continued operation along the high or higher speed curve can lead to motor stalling and even burnout. At or near the intersection points of motor operating curves, operation is switched from the high or higher speed operating curve to a lower speed, higher efficiency operating curve such that motor current is immediately reduced for the same motor speed and torque. If the motor is able to once again operate along the high or higher speed curve, a switch-back is made at or near the point of intersection. If more than two operating curves are provided for a DC motor, switches can be made from one curve to an adjacent curve. For more than two operating curves, switching is from the least efficient, to the next least efficient, etc. until operation of the motor is along the most efficient operating curve for the motor. Switch-backs are also effected as the energy dissipated in the motor is reduced, the load is reduced, etc. Preferably, some level of hysteresis is provided to prevent oscillation or hunting between two operating curves.

15 Claims, 2 Drawing Sheets

METHOD AND APPARATUS FOR CONTROLLING A DC ELECTRIC MOTOR

BACKGROUND OF THE INVENTION

The present invention relates to a method and apparatus for controlling a direct current (DC) electric motor and, more particularly, to a method and apparatus for controlling a DC motor to operate along preferred portions of two or more operating curves for the DC motor to thereby prevent stalling of the DC motor due to operation along an operating curve which is less efficient than one or more other operating curves for the DC motor. While the present invention is generally applicable to DC motor control, it will be described with reference to a DC electric motor for use in a windshield wiper system of a motor vehicle.

In motor vehicle windshield wiper systems, differing speeds for windshield wipers are often achieved by inducing inefficiencies into the wiper DC motors. One example of induced inefficiency is displacement of armature brushes from maximum efficiency with higher speeds resulting from greater displacements. While higher wiper speeds are required to clear the windshield when substantial moisture is being continuously accumulated on the windshield, oftentimes an operator of a motor vehicle will not reduce the speed of wiper operation as the moisture accumulation is reduced.

Also, as the moisture on the windshield is reduced, the load on a DC electric motor driving the windshield wipers increases dramatically for example when going from a wet wiping load to a damp or even dry wiping load. In a wet wiping load, the water on the windshield serves to lubricate the wiping of the wiper blades over the windshield. For damp or dry conditions, the lubrication of the water is reduced or gone altogether.

When considered together, it is apparent that a preoccupied motor vehicle operator who fails to reduce the wiper speed as the windshield progresses from a wet condition to a damp or dry condition is placing substantially greater loads on the windshield wiper motor while operating the motor along an operating curve which may be substantially less efficient than one or more available operating curves. Continued operation of the windshield wiper motor under these conditions can lead to motor stalling, overheating and burnout if not otherwise protected.

A number of automatic or self-acting arrangements have been proposed in the prior art to overcome these problems and protect windshield wiper motors. Such arrangements include: temperature sensor interrupters, which periodically stop a windshield wiper motor in the case of overheating; a circuit which de-energizes a motor when overloaded or stalled; a circuit which switches from continuous speed to intermittent operation upon overload and adjusts the period of intermittency to prevent overheating or destruction of the motor; and, a circuit which senses moisture on the windshield and changes the speed of a windshield wiper motor dependent upon the sensed moisture.

While these prior art arrangements assist in preventing motor overheating and burnout, a need remains for an arrangement which improves motor operation during overload conditions by fully utilizing the operating efficiencies of the motor throughout its normal operating range. Preferably such an arrangement would be automatic or self-acting to control motor operation such that the most efficient available operation is utilized in accordance with commanded operations and currently existing motor conditions such that the motor is operated along preferred portions of two or more operating curves for the motor. Further, switching between or among two or more operating curves would be performed to be substantially unobservable or transparent to the user of the motor.

SUMMARY OF THE INVENTION

This need is met by the method and apparatus of the present invention wherein a direct current (DC) electric motor is shifted between higher and lower operating speed curves in response to motor load or operating conditions. In its broadest aspects, the method and apparatus of the present invention switch between two or among more than two operating curves defined for the DC motor with switching preferably taking place approximately at points of intersection of speed versus torque operating curves of the motor.

For a two-speed DC motor, the speed versus torque curves for a high speed motor control setting and a low speed motor control setting intersect at one point where motor speed and torque are the same for operation on both curves. However, at the point of intersection of the two speed versus torque curves, motor current is substantially higher for operation on the high speed curve as compared to motor current for operation on the low speed curve. This current difference is due to the fact that the high or higher speed curve results from inducing inefficiency into the motor. Continued operation along the high or higher speed curve for high motor loads can result in motor stalling and even burnout.

In accordance with the present invention, at or near an intersection point of two motor operating curves, operation is switched from the high or higher speed operating curve to a low or lower speed, higher efficiency operating curve such that motor current is immediately reduced for approximately the same motor speed and torque. If the motor is able to once again operate along the high or higher speed curve, a switch-back is made at or near the point of intersection. Such would be the case, for example, if a windshield wiper operating on a dry windshield once again encounters rain.

If more than two operating curves are provided for a DC motor, switches are made from one curve to an adjacent curve. For more than two operating curves, switching progresses from the least efficient currently selected curve, to the next least efficient, etc. until operation of the motor is along the most efficient operating curve for the motor regardless of the selected speed setting for the DC motor. Switch-backs are also effected as the energy dissipated in the motor is reduced, the load is reduced, etc. Preferably, some level of hysteresis is provided to prevent oscillation or hunting between two operating curves.

In accordance with one aspect of the present invention, a control circuit for operating a direct current (DC) motor comprises switch means for selecting between at least a first speed and a second speed faster than the first speed for operation of the motor. The switch means connects power to a first terminal for selection of the first speed and a second terminal for selection of the second speed. Control means are connected between the first and second terminals and at least first and second speed inputs for the motor for preventing stalling of the motor in the second speed by switching between the second speed input and the first speed input dependent upon motor operating conditions when the second speed is selected by the switch means.

In accordance with another aspect of the present invention, a control circuit for operating a two speed direct current (DC) motor comprises switch means for selecting among a zero speed or motor off, a low speed and a high speed for operation of the two speed DC motor. The switch means connects power to a first terminal for selection of the low speed and a second terminal for selection of the high speed. Control means is connected between the first and second terminals and low speed and high speed inputs for the motor for preventing stalling of the motor in the high speed by switching between the high speed input and the low speed input dependent upon motor operating conditions when the high speed is selected by the switch means. Switching can be controlled in response to motor current flow, speed or torque. When switching is in response to current flow, the current flow can be monitored using a bimetallic element through which the current is passed.

In accordance with yet another aspect of the present invention, a method of controlling a direct current (DC) motor operable along one of two or more operating curves having different operating efficiencies and intersecting one another within the operating range of the DC motor comprises the steps of: selecting an operating curve which is less efficient than at least one other operating curve such that the DC motor is operated in accordance with desirable operating characteristics corresponding to the selected operating curve; monitoring at least one operating characteristic of the DC motor; comparing the at least one monitored operating characteristic to a value of the at least one monitored operating characteristic which corresponds approximately to intersection of the selected operating curve and the at least one other operating curve; and, switching between the selected operating curve and the at least one other operating curve in response to the preceding comparing step. The step of monitoring at least one operating characteristic may comprise the step of monitoring current flow in the DC motor, the step of monitoring torque delivered by the DC motor or the step of monitoring the speed of the DC motor.

It is thus a feature of the present invention to provide a method and apparatus for controlling a direct current (DC) electric motor by shifting between higher and lower operating speeds in response to motor operating conditions; to provide a method and apparatus for controlling a direct current (DC) electric motor by switching between two or among more than two operating curves defined for the DC motor in response to motor operating conditions; and, to provide a method and apparatus for controlling a direct current (DC) electric motor by switching between two or among more than two operating curves defined for the DC motor in response to motor operating conditions with switches preferably taking place approximately at points of intersection of the operating curves.

Other features and advantages of the invention will be apparent from the following description, the accompanying drawings and the appended claims.

DETAILED DESCRIPTION OF THE INVENTION

Figure 1:
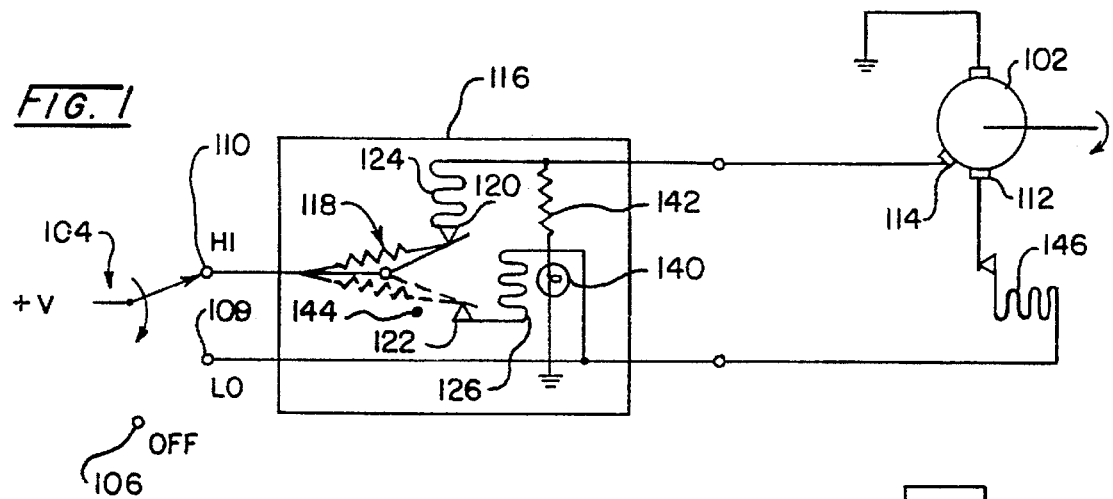
FIG. 1 is a schematic diagram of a circuit operable in accordance with the present invention for controlling a two speed direct current (DC) motor.
Figure 3:
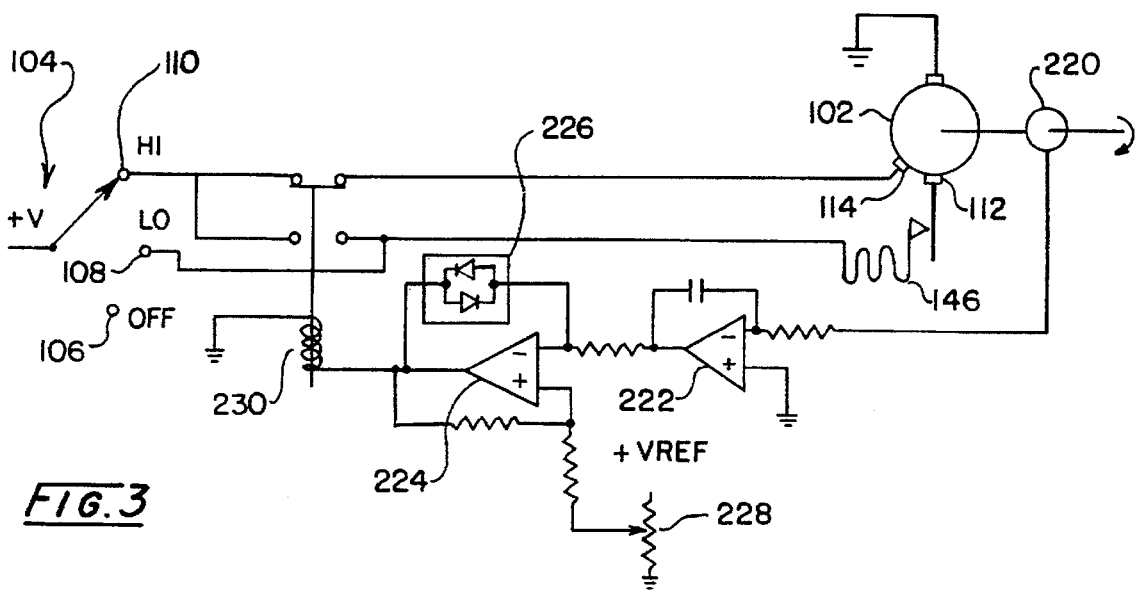
FIG. 3 is a schematic diagram of an alternate embodiment of a circuit operable in accordance with the present invention for controlling a two speed direct current (DC) motor.

Reference will now be made to the drawing figures wherein FIGS. 1 and 3 schematically illustrate alternate embodiments of apparatus operable in accordance with the present invention for controlling a two speed direct current motor. While the present invention is generally applicable to DC motor control, it will be described with reference to a DC electric motor for use in a windshield wiper system of a motor vehicle for which it is particularly applicable.

In motor vehicle windshield wiper systems, differing speeds for windshield wipers are often achieved by inducing inefficiencies into the wiper DC motors. One example of induced inefficiency is displacement of armature brushes from maximum efficiency with higher speeds resulting from greater displacements. As shown in FIGS. 1 and 3, a two speed DC wiper motor 102 is controlled by switch means comprising a three position wiper control switch 104.

The switch 104 defines three positions which select: a zero speed or motor off position; a low (LO) speed; and, a high (HI) speed. The motor off position corresponds to an open switch terminal 106; the LO speed motor position corresponds to a first switch terminal 108; and the HI speed motor position corresponds to a second switch terminal 110. The first switch terminal 108 or LO speed terminal and the second switch terminal 110 or HI speed terminal are connected to a low speed input 112 and a high speed input 114 of the motor 102 through control means for preventing stalling of the motor 102 in the HI speed. The control means comprises a bistable bimetallic circuit switcher 116 in the illustrated embodiment of FIG. 1.

The bistable bimetallic circuit switcher 116 comprises a bistable switch element 118 which stably rests against either a first electrical contact 120 or a second electrical contact 122. The first electrical contact 120 is secured to a first current monitoring bimetallic element 124 and the second electrical contact 122 is secured to a second current monitoring bimetallic element 126. When the switch 104 is set to select the HI speed of operation for the motor 102 via the second switch terminal 110 as shown in FIG. 1, electrical power, +V, is connected through second switch terminal 110, the bistable switch element 118, the first electrical contact 120 and the first current monitoring bimetallic element 124 to the high speed input 114 of the motor 102.

Figure 4:
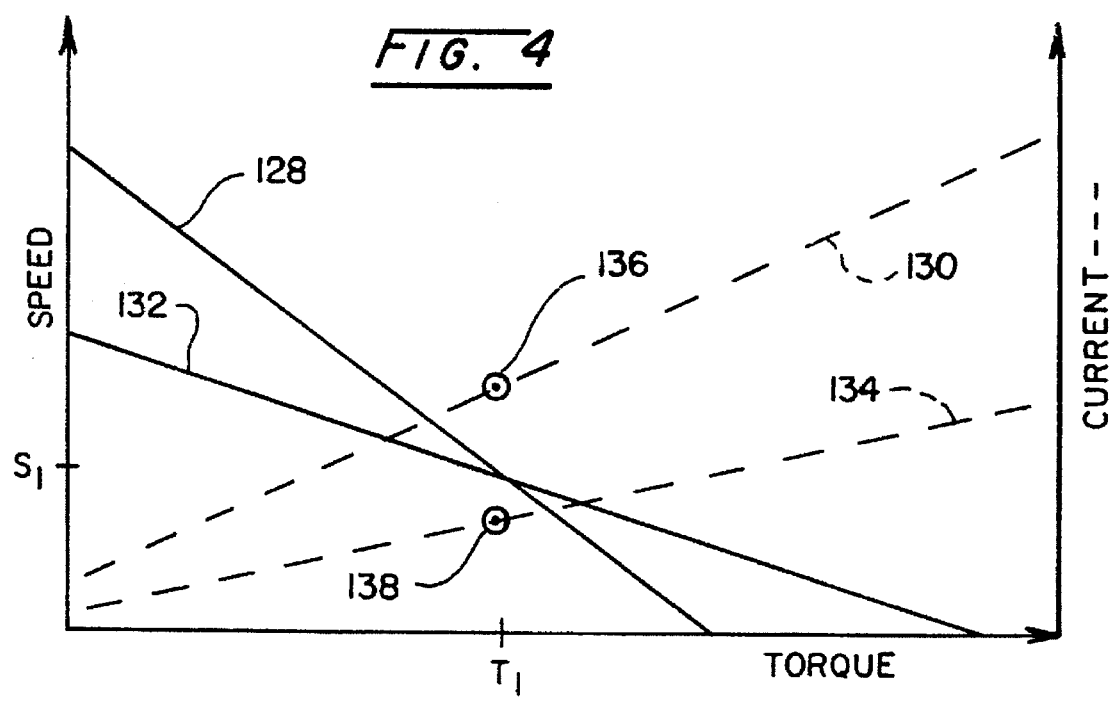
FIG. 4 is a graph of the operating curves for a two speed direct current (DC) motor illustrating the relationships between speed, torque and current for the two speed direct current (DC) motor when operated in accordance with the present invention.

For this position of the switch 104, the motor 102 is operated at its high speed along a high speed operating curve 128 and corresponding current line 130 shown in FIG. 4. As long as the load on the motor 102 is less than or equal to a torque $T_1$, operation along the higher speed upper portion of the curve 128 does not result in overloading the motor 102 even though the curve 128 is not as efficient as a low speed operating curve 132 and corresponding current line 134. Lower torque requirements are associated with a wet windshield while higher torques are required as the windshield becomes damp and ultimately dry. At torque requirements above $T_1$, there is a risk of motor overload and potential burnout.

Accordingly, at a torque level of about $T_1$, corresponding to a speed of about $S_1$ and a current of about 136, operation of the motor 102 is switched from operation along the high speed operating curve 128 to operation along the low speed operating curve 132. Since at this operating point, the speed and torque are the same for the two operating curves 128 and 132, the switch-over is substantially transparent to the operator of the motor 102; but motor current is substantially reduced from the current level of 136 on the current line 130 to a current level of 138 on the current line 134.

Switch-over is performed by operation of the bistable switch element 118 due to deformation or movement of the first current monitoring bimetallic element 124 which moves the bistable switch element 118 from engagement with the first electrical contact 120 to engagement with the second electrical contact 122. Since no current is conducted through the second current monitoring bimetallic element 126 prior to this switch-over, the second current monitoring bimetallic element 126 is heated or preconditioned for proper operation after switch-over by a heater 140 which is connected in series with a resistor 142 between the high speed input 114 and ground potential. To protect the motor 102 from overload and burnout during operation along the low speed operating curve 132, a contact stop 144 engages the bistable switch element 118 to permit the second current monitoring bimetallic element 126 to open the circuit to the low speed input 112 of the motor 102.

When the switch 104 is set to select the LO speed of operation for the motor 102 via the first switch terminal 108 as shown in FIG. 1, electrical power, +V, is connected to the low speed input 112 of the motor 102 through a bimetallic motor protection element 146 which can be set to a protection current different than the protection provided for by the contact stop 144 and/or can permit the elimination of the contact stop 144. For this position of the switch 104, the motor 102 is operated at its low speed along the low speed operating curve 132 and corresponding current line 134 shown in FIG. 4.

Figure 2:
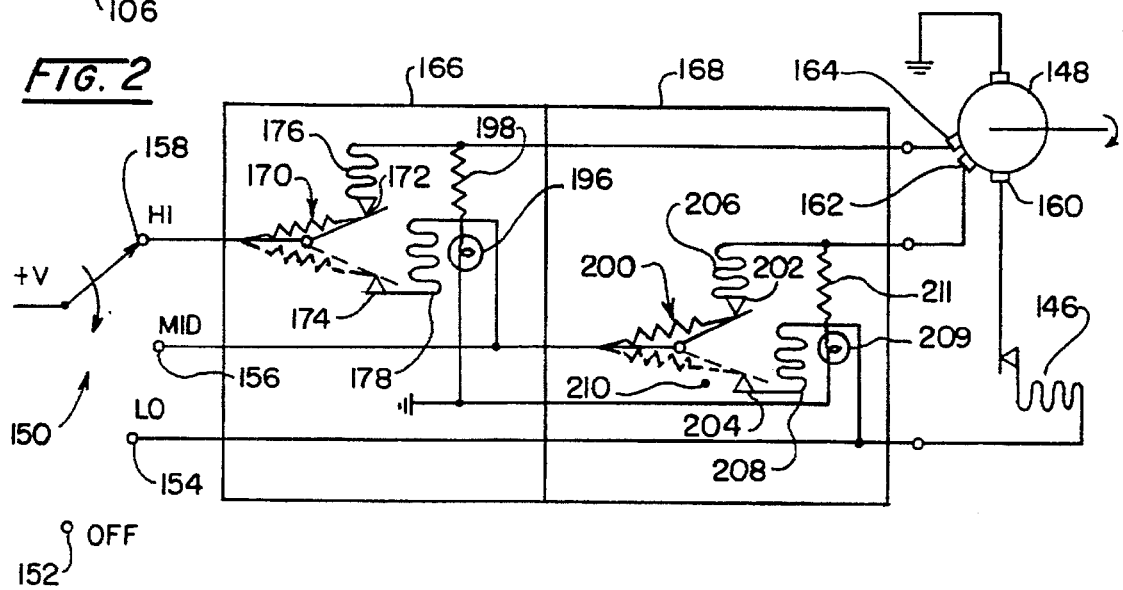
FIG. 2 is a schematic diagram of a circuit operable in accordance with the present invention for controlling a three speed direct current (DC) motor.

In a similar manner, a three speed motor 148 is shown in FIG. 2 and controlled by switch means comprising a four position wiper control switch 150. The switch 150 defines four positions which select: a zero speed or motor off position; a low (LO) speed; a middle (MID) speed; and, a high (HI) speed. The motor off position corresponds to an open switch terminal 152; the LO speed motor position corresponds to a first switch terminal 154; the MID speed motor position corresponds to a second switch terminal 156; and, the HI speed motor position corresponds to a third switch terminal 158. The first switch terminal 154 or LO speed terminal, the second switch terminal 156 or MID speed terminal and the third switch terminal 158 or HI speed terminal are connected to a low speed input 164, a middle speed input 162 and a high speed input 164 of the motor 148 through control means for preventing stalling of the motor 148 in the HI or MID speeds. The control means comprises a first bistable bimetallic circuit switcher 166 and a second bistable bimetallic circuit switcher 168 in the illustrated embodiment of FIG. 2.

The bistable bimetallic circuit switcher 166 comprises a bistable switch element 170 which stably rests against either a first electrical contact 172 or a second electrical contact 174. The first electrical contact 172 is secured to a first current monitoring bimetallic element 176 and the second electrical contact 174 is secured to a second current monitoring bimetallic element 178. When the switch 150 is set to select the HI speed of operation for the motor 102 via the third switch terminal 158 as shown in FIG. 2, electrical power, +V, is connected through third switch terminal 158, the bistable switch element 170, the first electrical contact 172 and the first current monitoring bimetallic element 176 to the high speed input 164 of the motor 148.

Figure 5:
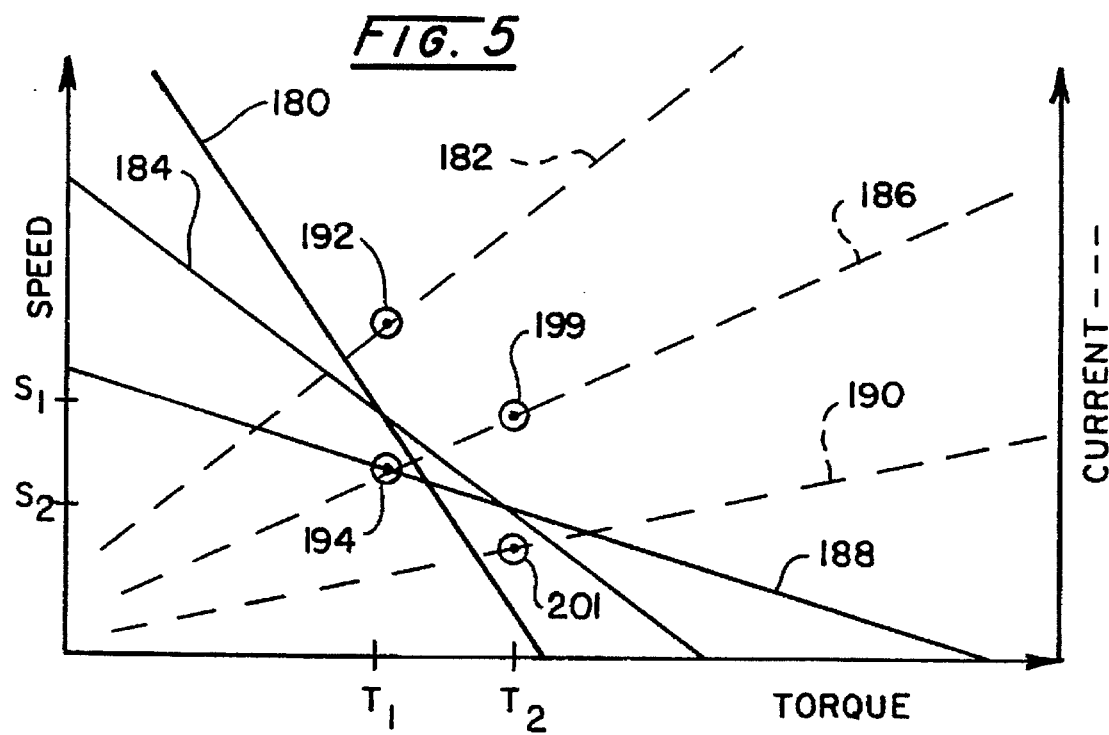
FIG. 5 is a graph of the operating curves for a three speed direct current (DC) motor illustrating the relationships between speed, torque and current for the three speed direct current (DC) motor when operated in accordance with the present invention.

For this position of the switch 150, the motor 148 is operated at its high speed along a high speed operating curve 180 and corresponding current line 182 shown in FIG. 5. As long as the load on the motor 148 is less than or equal to a torque $T_1$, operation along the higher speed upper portion of the curve 180 does not result in overloading the motor 148 even though the curve 180 is not as efficient as a middle speed operating curve 184 and corresponding current line 186 and a low speed operating curve 188 and corresponding current line 190. Lower torque requirements are associated with a wet windshield while higher torques are required as the windshield becomes damp and ultimately dry. At torque requirements above $T_1$, there is a risk of motor overload and potential burnout.

Accordingly, at a torque level of about $T_1$, corresponding to a speed of about $S_1$ and a current of about 192, operation of the motor 148 is switched from operation along the high speed operating curve 180 to operation along the middle speed operating curve 184. Since at this operating point, the speed and torque are the same for the two operating curves 180 and 184, the switch-over is substantially transparent to the operator of the motor vehicle including the wiper motor 148; but motor current is substantially reduced from the current level of 192 on the current line 182 to a current level of 194 on the current line 186.

Switch-over is performed by operation of the bistable switch element 170 due to deformation or movement of the first current monitoring bimetallic element 176 which moves the bistable switch element 170 from engagement with the first electrical contact 172 to engagement with the second electrical contact 174. Since no current is conducted through the second current monitoring bimetallic element 178 prior to this switch-over, the second current monitoring bimetallic element 178 is heated or preconditioned for proper operation after switch-over by a heater 196 which is connected in series with a resistor 198 between the high speed input 158 and ground potential.

The second bistable bimetallic circuit switcher 168 operates in a manner substantially the same as the switchers 116 and 168 to switch-over operation of the motor 148 from the middle speed operating curve 184 to the low speed operating curve 188. Switch-over is performed at a torque level of about $T_2$, corresponding to a speed of about $S_2$ with a resultant current reduction form a current of 199 to a current of 201 as shown in FIG. 5. The switcher 168 comprises a bistable switch element 200 which stably rests against either a first electrical contact 202 or a second electrical contact 204. The first electrical contact 202 is secured to a first current monitoring bimetallic element 206 and the second electrical contact 204 is secured to a second current monitoring bimetallic element 208. A heater 209 and associated resistor 211 are also provided.

To protect the motor 148 from overload and burnout during operation along the low speed operating curve 188, a contact stop 210 engages the bistable switch element 200 to permit the second current monitoring bimetallic element 208 to open the circuit to the low speed input 160 of the motor 148. The bimetallic motor protection element 146 which can be set to a protection current different than the protection provided for by the contact stop 210 and/or can permit the elimination of the contact stop 210. Similar expansions of the present invention for operation with DC motors having more than three operating curves are performed by cascading additional bistable bimetallic circuit switchers as will be apparent to those skilled in the art.

An alternate embodiment of apparatus operable in accordance with the present invention for controlling the two speed wiper motor 102 is shown in FIG. 3. In accordance with this embodiment, a current or torque monitoring device 220 is coupled to an output shaft of the motor 102 for generating a signal representative of the speed of the motor 102 or the torque load of the motor. A variety of current and torque monitors are commercially available and, since their structure is not important the present invention, they will not be more fully described herein. In any event, the signal from the current or torque monitoring device 220 is integrated by an operational amplifier 222 resulting in an output signal having a voltage level which is proportional to the speed of the motor 102 or the torque load on the motor 102.

The output from the operational amplifier 222 is passed to a comparator circuit 224 which includes a limit circuit 226 taking the form of a pair of parallel connected diodes in the illustrated embodiment of FIG. 3 to provide hysteresis for operation of the comparator circuit 224. The output from the operational amplifier 222 is compared to a portion of a reference voltage $V_{REF}$ selected by a potentiometer 228. The portion of the reference voltage $V_{REF}$ is selected to correspond to a desired motor operating point for switch-over from operation along the high speed operating curve 128 to operation along the low speed operating curve 132. As previously described, the switch-over point is defined by a speed $S_1$ or a torque $T_1$ as illustrated in FIG. 4.

Approximately at this switch-over point, a relay 230 is operated to operate the motor 102 along the low speed operating curve 132 for speeds below $S_1$ or torques above torque $T_1$. Hysteresis provided by the limit circuit 226 produces minor deviation from switch-over precisely at the designated speed or torque; however, it prevents hunting or oscillation of the wiper motor 102 around the switch-over point.

Having thus described the method and apparatus of the present invention in detail and by reference to preferred embodiments thereof, it will be apparent that modifications and variations are possible without departing from the scope of the invention defined in the appended claims.

What is claimed is:

1. A control circuit for operating a two speed direct current (DC) motor comprising:

switch means for selecting among a zero speed or motor off, a low speed and a high speed for operation of said two speed DC motor, said switch means connecting power to a first terminal for selection of said low speed and a second terminal for selection of said high speed; and control means connected between said first and second terminals and low speed and high speed inputs for said motor for preventing stalling of said motor in said high speed by switching between said high speed input and said low speed input dependent upon motor operating conditions when said high speed is selected by said switch means.

2. A control circuit for operating a two speed direct current (DC) motor as claimed in claim i wherein said control means comprises a bistable bimetallic circuit switcher for monitoring the current flowing to said motor when said high speed is selected and switching said motor between said high speed and said low speed dependent upon the level of current flowing to said motor.

3. A control circuit for operating a two speed direct current (DC) motor as claimed in claim 2 wherein said bistable bimetallic circuit switcher performs switching operations between said high speed and said low speed at a current level approximately corresponding to the operating point of said two speed motor whereat the speed and torque for both low speed operation and high speed operation approximately equal one another.

4. A control circuit for operating a two speed direct current (DC) motor as claimed in claim 3 further comprising a first heater element, said first heater element being operated when said high speed input is activated.

5. A control circuit for operating a two speed direct current (DC) motor as claimed in claim 1 wherein said control means comprises:

relay means for selectively connecting said second terminal to said high speed input of said motor and said low speed input of said motor; and controller means for operating said relay dependent upon the operating speed of said motor.

6. A control circuit for operating a two speed direct current (DC) motor as claimed in claim 5 wherein said controller means comprises:

speed monitoring means coupled to said motor for monitoring the operating speed of said motor and generating a speed signal representative of said operating speed; and comparator means connected to said relay for comparing said speed signal to a switch point signal representative of a motor speed above which said second terminal is to be connected to said high speed input and below which said second terminal is to be connected to said low speed input.

7. A control circuit for operating a two speed direct current (DC) motor as claimed in claim 6 wherein said comparator means includes hysteresis such that said second terminal is connected to said high speed input upon the operating speed of said motor falling below said switch point signal by a first predefined hysteresis value and said second terminal is reconnected to said high speed input after having been connected to said low speed input upon the operating speed of said motor exceeding said switch point signal by a second predefined hysteresis value.

8. A control circuit for operating a two speed direct current (DC) motor as claimed in claim 7 wherein said first predefined hysteresis value is equal to said second predefined hysteresis value.

9. A control circuit for operating a direct current (DC) motor comprising:

switch means for selecting between at least a first speed and a second speed faster than said first speed for operation of said motor, said switch means connecting power to a first terminal for selection of said first speed and a second terminal for selection of said second speed; and control means connected between said first and second terminals and at least first and second speed inputs for said motor for preventing stalling of said motor in said second speed by switching between said second speed input and said first speed input dependent upon motor operating conditions when said second speed is selected by said switch means.

10. A control circuit for operating a direct current (DC) motor comprising:

switch means for selecting between at least a first speed, a second speed faster than said first speed and a third speed faster than said second speed for operation of said motor, said switch means connecting power to a first terminal for selection of said first speed, a second terminal for selection of said second speed and a third terminal for selection of said third speed; and control means connected between said first, second and third terminals and at least first, second and third speed inputs for said motor for preventing stalling of said motor in said second speed by switching between said second speed input and said first speed input dependent upon motor operating conditions when said second speed is selected by said switch means, and for switching among said third speed input, said second speed input and said first speed input when said third speed input is selected by said switch means.

11. A method of controlling a direct current (DC) motor operable along one of two or more operating curves having different operating efficiencies and intersecting one another within the operating range of said DC motor, the method comprising the steps of:

selecting an operating curve which is less efficient than at least one other operating curve such that said DC motor is operated in accordance with desirable operating characteristics corresponding to said selected operating curve;

monitoring at least one operating characteristic of said DC motor;

comparing said at least one monitored operating characteristic to a value of said at least one monitored operating characteristic which corresponds approximately to intersection of said selected operating curve and said at least one other operating curve; and switching between the selected operating curve and said at least one other operating curve in response to the preceding comparing step.

12. A method of controlling a direct current (DC) motor as claimed in claim 11 wherein said step of monitoring at least one operating characteristic comprises the step of monitoring current flow in said DC motor.

13. A method of controlling a direct current (DC) motor as claimed in claim 12 wherein said steps of comparing said at least one monitored operating characteristic to a value of said at least one monitored operating characteristic and switching between the selected operating curve and said at least one other operating curve comprises the steps of:

passing operating motor current through a bimetallic element adapted to switch between said selected operating curve and said at least one other operating curve; and setting said bimetallic element to switch between said selected operating curve and said at least one other operating curve at a current which corresponds approximately to intersection of said selected operating curve and said at least one other operating curve.

14. A method of controlling a direct current (DC) motor as claimed in claim 11 wherein said step of monitoring at least one operating characteristic comprises the step of monitoring torque delivered by said DC motor.

15. A method of controlling a direct current (DC) motor as claimed in claim 11 wherein said step of monitoring at least one operating characteristic comprises the step of monitoring the speed of said DC motor.

* * * * *